(12) United States Patent
Child et al.

(10) Patent No.: US 6,801,946 B1
(45) Date of Patent: Oct. 5, 2004

(54) OPEN ARCHITECTURE GLOBAL SIGN-ON APPARATUS AND METHOD THEREFOR

(75) Inventors: Garry Lee Child, Austin, TX (US); Dah-Haur Lin, Austin, TX (US); Larry Fichtner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 09/594,518

(22) Filed: Jun. 15, 2000

(51) Int. Cl.[7] .............................................. G06F 15/16
(52) U.S. Cl. ..................................... 709/230; 709/219
(58) Field of Search ................................. 709/200–253

(56) References Cited

U.S. PATENT DOCUMENTS

| | | | | |
|---|---|---|---|---|
| 5,684,950 A | * | 11/1997 | Dare et al. ................... | 713/201 |
| 5,944,824 A | * | 8/1999 | He .............................. | 713/201 |
| 6,016,508 A | * | 1/2000 | Chu et al. .................... | 709/223 |
| 6,085,188 A | * | 7/2000 | Bachmann et al. ............ | 707/3 |
| 6,178,511 B1 | * | 1/2001 | Cohen et al. ................. | 713/201 |
| 6,240,512 B1 | * | 5/2001 | Fang et al. ................... | 713/150 |
| 6,243,816 B1 | * | 6/2001 | Fang et al. ................... | 713/202 |
| 6,275,941 B1 | * | 8/2001 | Saito et al. ................... | 713/201 |
| 6,275,944 B1 | * | 8/2001 | Kao et al. .................... | 713/202 |
| 6,539,382 B1 | * | 3/2003 | Byrne et al. .................. | 707/10 |
| 6,556,995 B1 | * | 4/2003 | Child et al. ................... | 707/9 |
| 6,557,039 B1 | * | 4/2003 | Leong et al. ................. | 709/229 |
| 6,609,198 B1 | * | 8/2003 | Wood et al. .................. | 713/155 |
| 6,629,246 B1 | * | 9/2003 | Gadi ............................ | 713/202 |
| 6,643,782 B1 | * | 11/2003 | Jin et al. ...................... | 713/201 |
| 2002/0083336 A1 | * | 6/2002 | Bradford et al. ............. | 713/201 |

OTHER PUBLICATIONS

Novell, Inc., "Novell Single Sign-on Makes Network Access a Reality", Press Release, Provo, Utah, Jul. 21, 1999.*

"Single Sign-On Deployment Guide", Netscape Communications Corporation, http://developer.netscape.com/docs/manuals/security/sso/contents.htm, 1997.*

IBM Technical Disclosure Bulletin, "Flexible DCE User Management through GSO", Issue 429, p. 180, Jan. 1, 2000.*

IBM Technical Disclosure Bulletin, "Handling GSO Checkpoints in a Tivoli Environment", Issue 428, p. 1696, Dec. 1, 1999.*

IBM Technical Disclosure Bulletin, "Multi-Modal Data Access", Issue 426, p. 1393, Oct. 1, 1999.*

Request for Comments: 1823, *The C LDAP Application Program Interface* by M. Smith, T. Howes, A. Herron, M. Wahl., and A. Anantha (Oct. 8, 1999), pp. 1–71.

Request for Comments: 1777, *Lightweight Directory Access Protocol* by W. Yeong, T. Howes and S. Kille (Mar. 1995), pp. 1–18.

Request for Comments: 1510, *The Kerberos Network Authentication Service (V5)* by J. Kohl, C. and C. Neuman (Sep. 1993), pp. 1–99.

Request for Comments: 2222, *Simple Authentication and Security Layer (SASL)* by J. Myers (Oct. 1997), pp. 1–14.

(List continued on next page.)

*Primary Examiner*—David Wiley
*Assistant Examiner*—Scott M. Collins
(74) *Attorney, Agent, or Firm*—Winstead Sechrest & Minick P.C.; Jeffrey S. LaBaw

(57) ABSTRACT

A global sign-on mechanism (GSO) is implemented. The mechanism provides a GSO system and method for a networked data processing system within an open architecture framework. The system and method are constructed on a Lightweight Directory Access Protocol (LDAP) framework by defining a set of data structures, the GSO LDAP schema. GSO functionality is effected using protocol operations on the LDAP object and attribute instances as defined in accordance with the GSO schema.

12 Claims, 7 Drawing Sheets

OTHER PUBLICATIONS

Request for Comments: 2251, *Lightweight Directory Access (V3)* by M. Wahl and S. Kille (Dec. 1997), pp. 1–44.

*Understanding LDAP* by Heinz Johner, Larry Brown, Franz–Stefan Hinner, Wolfgang Reis, and John Westman (IBM, International Technical Support Organization, http://www.redbooks.ibm.com), pp. 1–177.

*LDAP Implementation Cookbook* by Heinz Johner, Michel Melot, Harri Stranden, and Permana Widhiasta (IBM, International Technical Support Organization, http://www.redbooks.imb.com), pp. 1–293.

Request for Comments: 1274, *The COSINE and Internet X.500 Schema* by P. Barker and S. Kille (Nov. 1991), pp. 1–52.

Request for Comments: 2256, *A Summary of the X.500 (96) User Schema for use with LDAPv3* by M. Wahl (Dec. 1997), pp. 1–18.

* cited by examiner

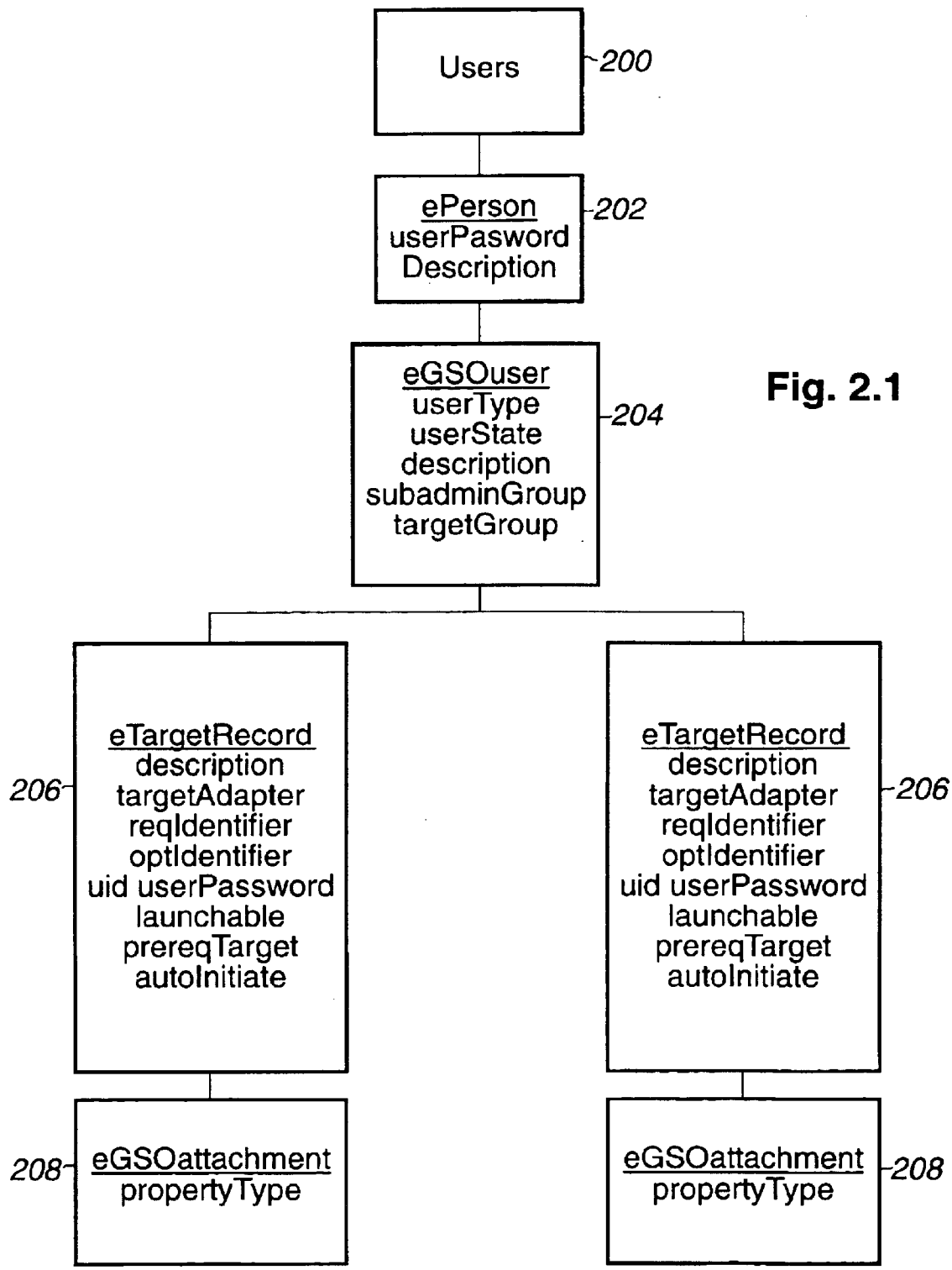
Fig. 2.1

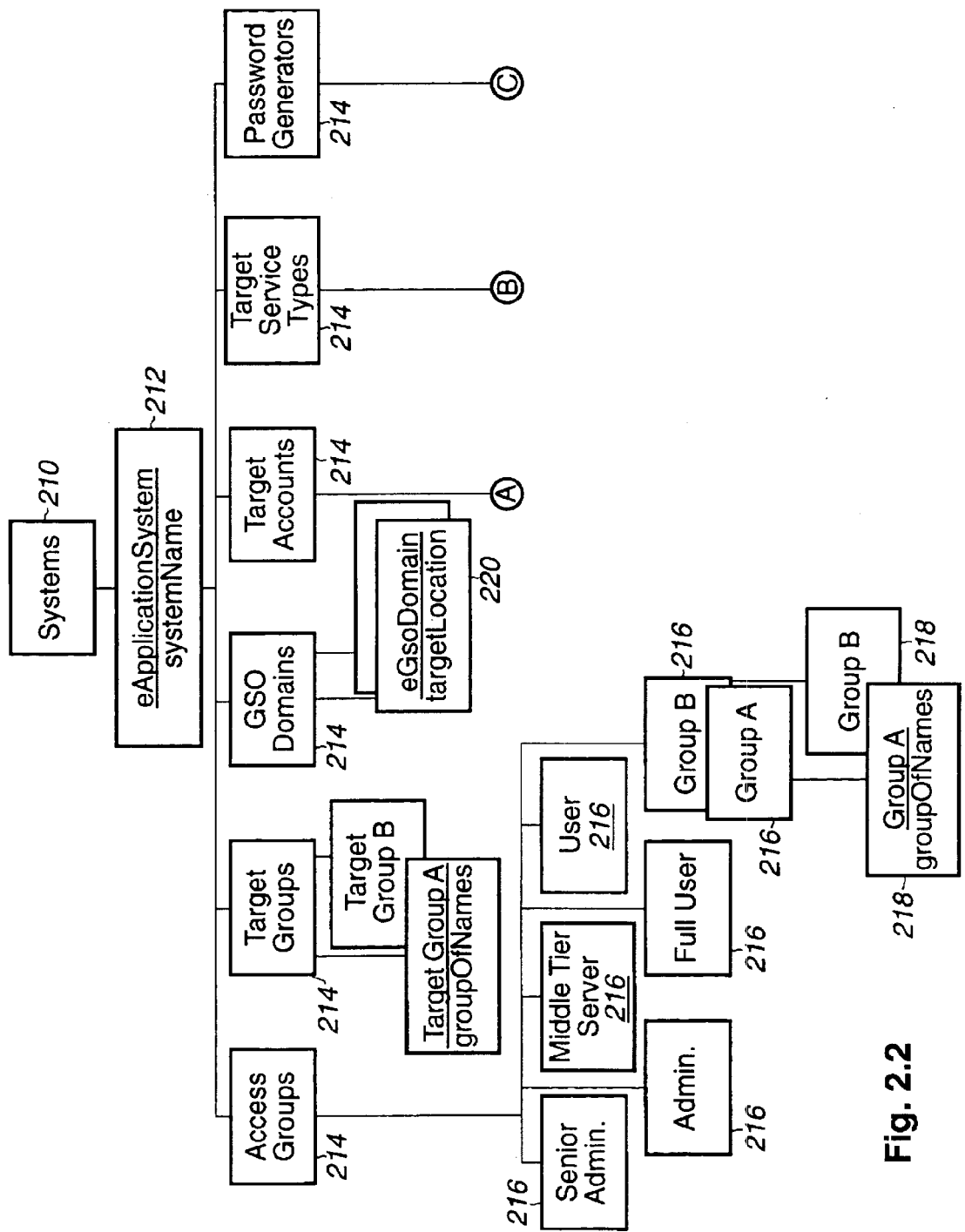
Fig. 2.2

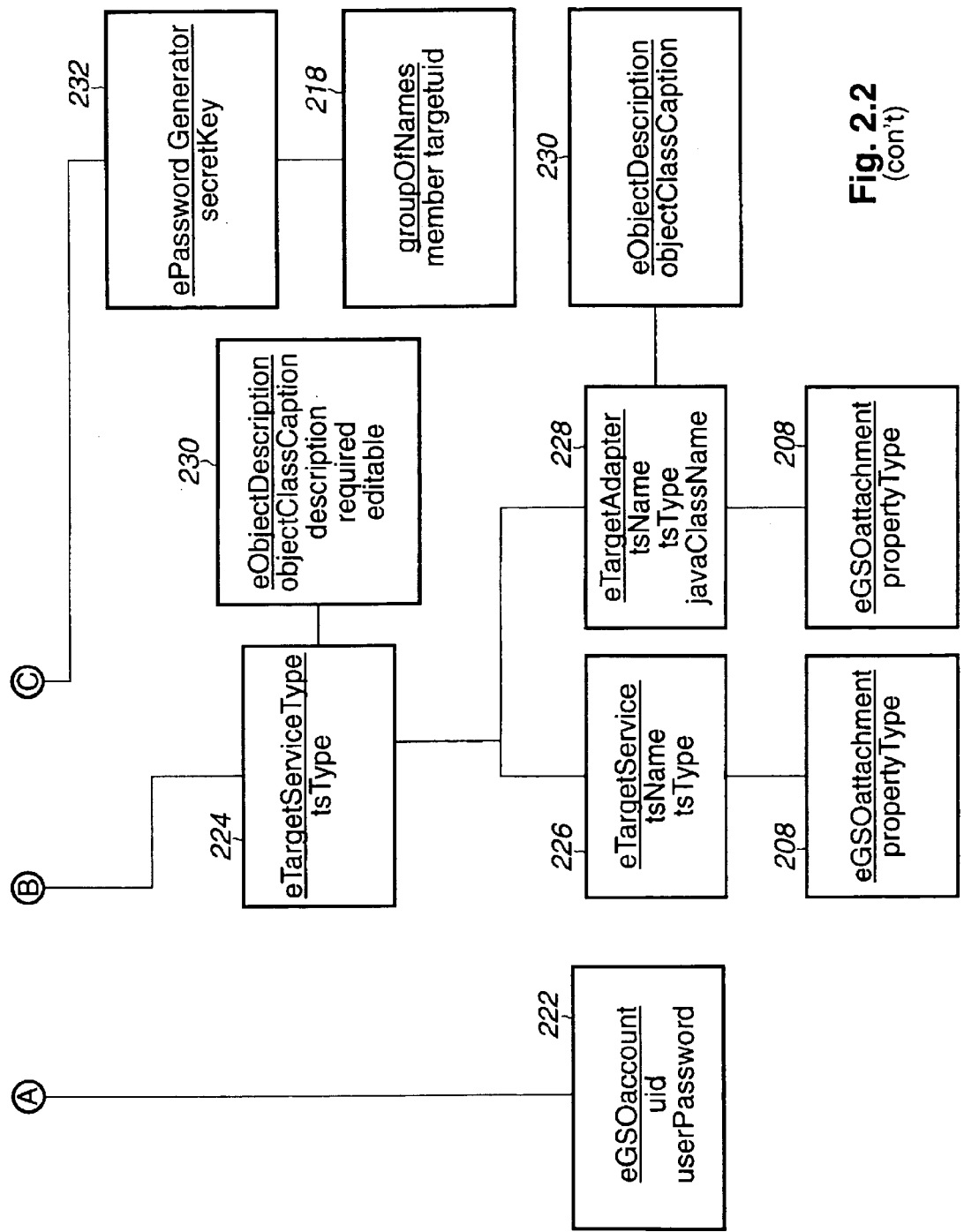
Fig. 2.2 (con't)

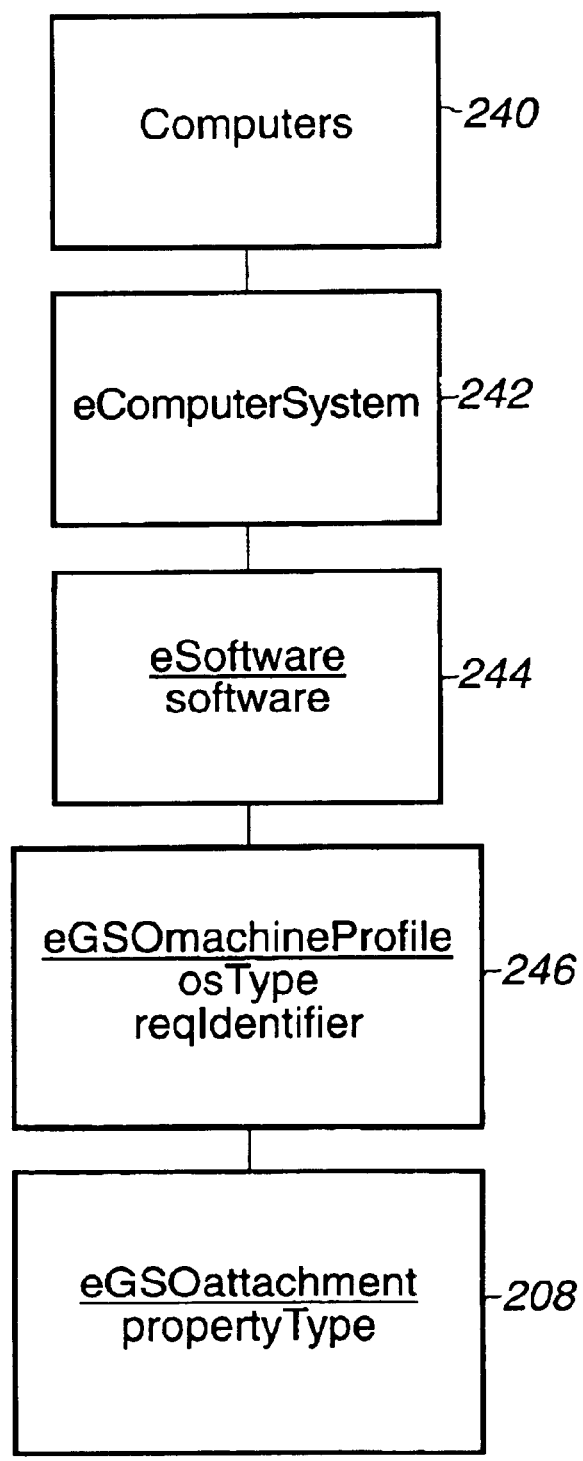
Fig. 2.3

(con't)

OPEN ARCHITECTURE GLOBAL SIGN-ON APPARATUS AND METHOD THEREFOR

CROSS-REFERENCE TO RELATED APPLICATION

Related subject matter may be found in the following commonly assigned, co-pending U.S. Patent Application which is hereby incorporated herein by reference: Ser. No. 09/594,628 (AUS-00-0170US1), entitled "GLOBAL SIGN-ON APPARATUS AND METHOD THEREFOR."

TECHNICAL FIELD

The present invention relates in general to data processing systems, and in particular, to global sign-on technology in data processing systems.

BACKGROUND INFORMATION

Users in an enterprise computing environment typically must access several different systems, each potentially having unique and separate user identifiers (UID) and passwords. Global sign-on technology allows all of the UIDs and passwords to be maintained automatically by the global sign-on system (hereinafter, simply "GSO"). The GSO allows the user to have only a single GSO UID and password. Thereafter, GSO manages the various UIDs for the target systems that the user needs to access. GSO can automatically start a target application, for example, groupware application or terminal emulation, and log the user into the target system using the appropriate UID and password for that system.

Current implementations of GSO maintain the GSO "database" within a distributed computing environment. This, however, requires a system manager that wishes to implement a GSO to develop and maintain a distributed computing environment installation. Consequently, there is a need in the art for systems and methods for implementing a GSO in an open architecture environment, for example the Internet, while preserving the security afforded by a distributed computing environment.

SUMMARY OF THE INVENTION

The aforementioned needs are addressed by the present invention. Accordingly, there is provided, in a first form, a method for global sign-on (GSO). The method includes receiving a user login and determining an existence of a first directory entry corresponding to the user in response to a first Lightweight Directory Access Protocol (LDAP) message. The first directory entry represents a data structure in accordance with a defined LDAP GSO schema. The user is logged into one or more data processing services in response to a corresponding one or more second directory entries also representing a data structure in accordance with a corresponding second predetermined LDAP schema object.

There is also provided, in a second form, a computer program product embodied in a tangible storage medium. The program product includes programming for global sign-on (GSO), having instructions for performing the steps of receiving a user login and determining an existence of a first directory entry corresponding to the user in response to a first Lightweight Directory Access Protocol (LDAP) message. Also included are instructions for logging the user into one or more data processing services in response to one or more second directory entries, and wherein each of the first and second directory entries represents a data structure in accordance with a corresponding first and second predetermined LDAP schema object.

Additionally provided, in a third form, is a GSO data processing system. The system contains circuitry operable for receiving a user login, and circuitry operable for determining an existence of a first directory entry corresponding to the user in response to a first Lightweight Directory Access Protocol (LDAP) message. User are logged into the system via circuitry contained therein operable for logging the user into one or more data processing services in response to one or more second directory entries, and wherein each of the first and second directory entries represents a data structure in accordance with a corresponding first and second predetermined LDAP schema object.

BRIEF DESCRIPTION OF THE DRAWINGS

For a more complete understanding of the present invention, and the advantages thereof, reference is now made to the following descriptions taken in conjunction with the accompanying drawings, in which:

FIG. 2.1 illustrates, in block diagram form, a Lightweight Directory Access Protocol (LDAP) user schema which, may be used in an embodiment of the present invention;

FIG. 2.2 illustrates an LDAP systems schema which may be used in an embodiment of the present invention;

FIG. 2.3 illustrates an LDAP computer schema which may be used in an embodiment of the present invention.

DETAILED DESCRIPTION

Figure 1:
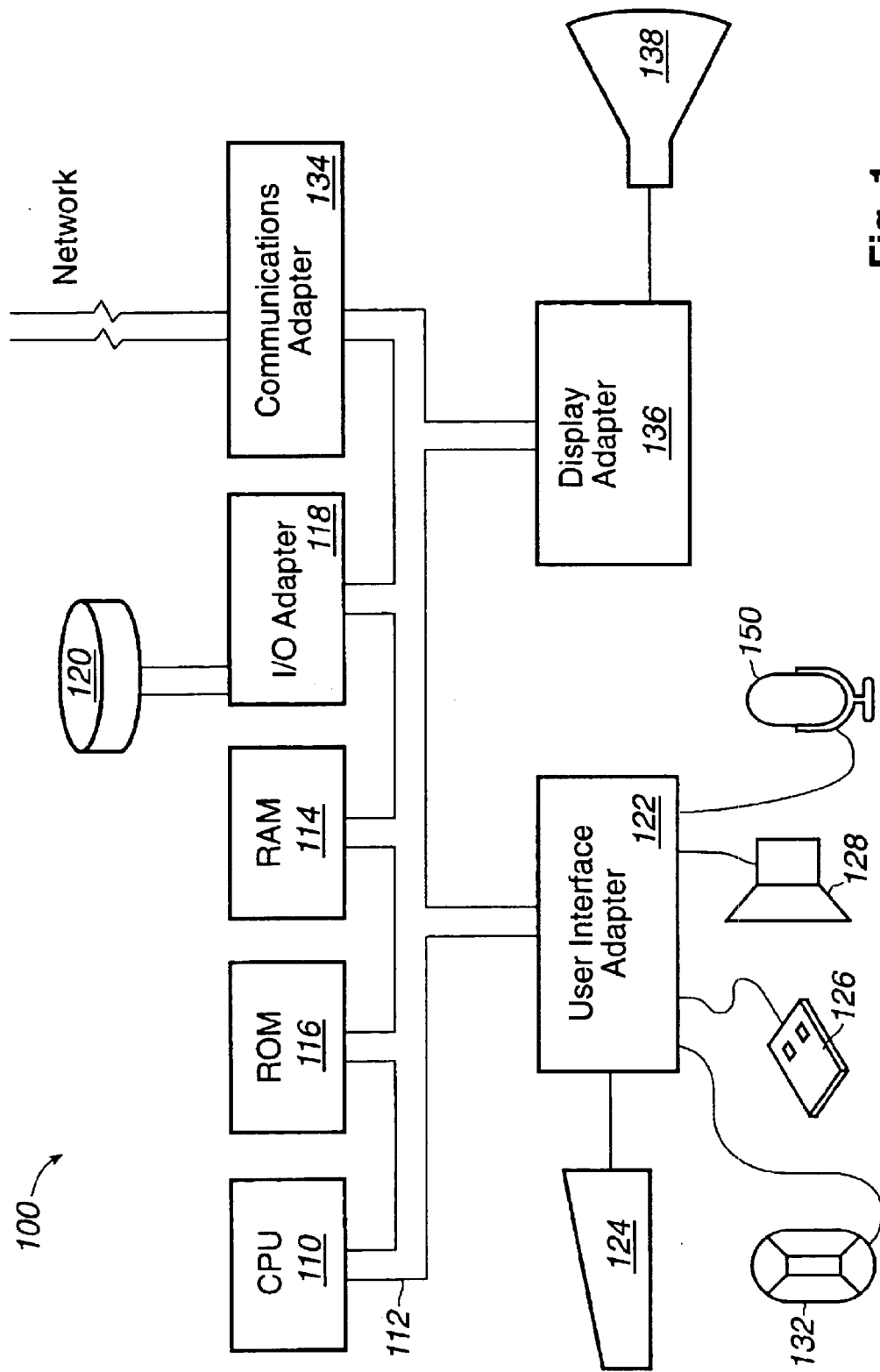
FIG. 1 illustrates, in block diagram form, a data processing system implemented in accordance with an embodiment of the present invention.

The present invention provides a global sign-on system (GSO) and methodology which may be used in an open architecture networked data processing system. The system and method are implemented on a Lightweight Directory Access Protocol (LDAP) GSO schema. The GSO and methods therefore, in accordance with the present invention, use LDAP messages to perform protocol operations on the LDAP objects and attributes as defined in the GSO schema.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter. 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like,the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

FIGS. 2.1, 2.2 and 2.3 illustrate LDAP GSO schema that may be used with the present invention. LDAP is a standardized protocol that is used to provide directory access. LDAP version 2 is specified in Request for Comments (RFC) 1777, March 1995, which is hereby incorporated herein by reference. LDAP version 3 is specified in RFC 2251, (Copyright 1997 by The Internet Society), which is also hereby incorporated herein by reference. (RFCs are Internet publications that constitute the principal means by which standards are promulgated.) In LDAP, protocol operations are encapsulated in an LDAP message exchanged over the network between the client requesting the directory access service, and a server providing the directory access service. Directory entries include a set of attributes. An attribute type definition specifies the sets of values that an attribute of that type may take, the syntax to which the values must conform and the kinds of operations that may be performed on the values of that attribute type. An object class is a container class of a set of attribute types. The definition of a particular object class specifies the attribute types associated with an instance of the object class. Object classes may themselves contain sub-objects. The relationship between an object and its sub-objects, if any, is essentially a parent-child relationship, although, an object type can inherit the attribute types of the parent. An LDAP schema is a collection of attribute type definitions, object class definitions and other information which a server uses to perform operations on the directory entries in association with asserted attribute values. The LDAP schema used to implement GSO, the LDAP GSO Schema, are illustrated in FIGS. 2.1, 2.2 and 2.3.

Directory entries in LDAP are instances of particular defined object types. Object class definitions for objects that may be used with the present invention are included in Appendix A. Object classes maybe derived from superclasses, including classes defined in the LDAP specifications discussed above. Directory entries are hierarchical and the parents may have associated therewith another entry, the child, which parent/child relationship is exploited by LDAP directory operations. Referring now to FIG. 2.1, there is illustrated therein a GSO schema for a user portion 200 of an LDAP GSO schema in accordance with the principles of the present invention.

An eGSOuser class object 204 is associated with an ePerson class object 202. The eGSOuser object 204 is a child entity of the ePerson object 202. The eGSOuser class object 204 is a container class containing user specific information for the subset of users that are enabled for GSO. An eGSOuser object 202 may include a userType attribute and a userState attribute. The userType indicates the type of user and reflects the access available to the corresponding user. In an embodiment of the present invention these may be, for example, Senior Administrator, Administrator, Middle Tier Server, Full User, and User. These userType attribute values are associated with levels of access to GSO data in the directory. A Senior Administrator has access to be able to manage all GSO data and also access to create other administrators (i.e. create instances in the directory of eGSOuser objects having a userType attribute value of "Administrator.") An Administrator has access to be able to manage all GSO data but cannot create other administrators. A Middle Tier Server has access to read all GSO data but cannot update GSO data. (A user of Middle Tier server userType may operate on behalf of multiple clients, so must be able to read everything.) A Full User has access to read and write that user's (the user associated with the corresponding instance of eGSOuser object), data, including, for example, passwords. Thus, such a user may update its passwords. Users have only read access, and thus, cannot update GSO data. In other words, a User cannot change its password, for example.

The userState attribute indicates the current state for the user. In an embodiment of the present invention, possible values are "Enabled" and "Disabled." In this way, a user maybe disabled for GSO without having to delete the eGSOuser instance associated with the disabled user. Additionally, eGSOuser derives the commonName attribute ("cn") from the ePerson class 202. The commonName attribute contains the name of an object, and in the ePerson class 202, the commonName attribute contains a value corresponding to the name of a person. Thus, in an instance of an ePerson object class 202 for a given user, the value contained in the commonName attribute corresponds to the name of the given user. The commonName attribute is defined in the standard LDAP user schema, implemented by all LDAP enabled data processing systems. The definition of the LDAP user schema is specified in RFC 2256, entitled "A Summary of the X.500(96) User Schema for Use with LDAPv3", (Copyright 1997, The Internet Society) and hereby incorporated herein by reference.

The eGSOuser class object 204 may contain additional attributes. These are omitted from the illustration from FIG. 2.1 for clarity. However, Appendix A includes a table of all object class definitions, including the attribute types which may be contained by the object class. Additionally, the definitions of GSO attributes may be found in the attribute tables in Appendix B. Attributes in accordance with the standard LDAP user schema are found in RFC 2256. These include, for example, the surname attribute ("sn") which contains the family name of a person, a userPassword attribute and the description attribute which contains a human-readable description of the associated object. It would be understood by an artisan of ordinary skill that particular attributes may be designated as being optional in the standardized LDAP user schema whereby particular implementations of the schema may omit those attributes. Similarly, alternative embodiments of the GSO schema may implement those attributes designated in the attribute tables as optional, or, alternatively, omit implementation of optional attributes. It would be further understood by an artisan of ordinary skill that alternative embodiments may selectively implement optional attributes. An artisan of ordinary skill in the pertinent art would recognize that such data processing systems and methods in accordance with the principles of the GSO schema herein would be within the spirit and scope of the present invention.

An eGSOuser class object 204 has associated one or more eTargetRecord class objects 206. The eTargetRecord objects 206 describe the target that a eGSOuser may launch. An eTargetRecord object 206 may contain several attributes. These are provided in the class definition in Appendix A. These include the targetAdapter, reqIdentifier, optIdentifier, uid, userPassword, launchable and autoInitiate attributes.

The value of the userid (uid) attribute contains a predetermined user identifier string (UID) for the corresponding target. The syntax is adopted from the X.500 directory schema and is specified in RFC 1274, November 1991, hereby incorporated herein by reference. The corresponding user password is the value of the userPassword attribute for the target associated with the eTargetRecord object. The syntax of the attribute is defined in RFC 2256. The definitions of the remaining of the aforesaid attributes are included in Appendix B. Each of these attributes will be further discussed in conjunction with FIG. 3 hereinbelow, and because, as discussed herein above, in alternative embodiments, optional attributes may be selectively omitted.

An eTargetRecord object 206, may have associated an eGSOattachment 208 class object is used by the GSO to provide additional data relevant to the eTarget Record object 206 containing it. The attachment data in the eGSOattachment object may have associated additional files or information needed by the target. An example might be "INI" files. An eGSOattachment object may also be maintained in a GSO-specific object subtree beneath a corresponding eTarget Service class object, and eTargetAdapter class object, or an eGSOmachineProfile class object, each of which are discussed herein below.

An eGSOattachment object may contain one or more attributes. One eGSOattachment object includes a Property Type attribute. The definition of such attribute is the Property Type attribute. The values of the Property Type attribute, which may include multiple values, indicates the type of attachment that is contained in the eGSOattachment object. Note that attributes within the LDAP may take a set of values, that is, be multi-valued. Additional attributes which eGSOattachment objects 208 may take are indicated in the full definition provided in Appendix A. Attribute definitions are specified in Appendix B.

Refer now to FIG. 2.2 illustrating a GSO schema for a systems portion 210 of an LDAP GSO schema in accordance with the principles of the present invention. Systems hierarchy 210 includes an eApplicationSystem class object 212. An eApplicationSystem 212 will be a container object or "anchor point" for a plurality of GSO schema subtrees. Additionally, eApplicationSystem object 212 may include one or more attributes. These are specified in the object class definition in Appendix A. For example, the value of systemName attribute represents the system name corresponding to the eApplicationSystem object. The eApplicationSystem object is derived from the Common Information Model (CIM) promulgated by the Distributed Management Task Force (DMTF). Exemplary systems that might be represented by an eApplicationSystem object 212 are discussed in the LDAP IMPLEMENTATION COOKBOOK by HEINZ JOHNER, ET AL. (Copyright 1999, International Business Machines Corporation), which is hereby incorporated herein by reference. CIM provides a set of classes with properties and associations that comprise a conceptual framework for organizing information about a managed environment. The structure of the CIM is described in the common information model (CIM) specification, version 2.2 which is hereby incorporated herein by reference. CIM defines schema for managed elements in a system. The managed elements may include physical objects such as computer systems. CIM is structured into a core model and a common model. The core model is an information model that captures notions that are applicable to all areas of management, while the common model is an information model that captures notions common to particular management areas, but independent of a particular technology or implementation.

As previously mentioned, eApplicationSystem object 212 contains a plurality of GSO subtrees, each of which is anchored by a container class object 214. The definition of the container class is included in Appendix A. The container class is derived from the top class, one of the two abstract classes that every entry contains, in accordance with the LDAP specification. Each container object 214 includes a cn attribute, the value of which indicates the type of GSO subtree for which the corresponding container object 214 is the anchor point. (In FIG. 2.2, the label "cn" is omitted from the common name indicated inasmuch as in the embodiment of FIG. 2.2, container objects 214 include only the cn attribute.)

The accessGroups container object 214 contains a plurality of accessGroup objects 216. The accessGroup object 216 may have a format that is the same as groupofNames objects 218, described below. Each accessGroup object 216 may include a member attribute defined in Appendix B. The member attribute is multivalued. The values in a member attribute contain the list of entities having the corresponding level of access. In the embodiment illustrated in FIG. 2.2, five accessGroup objects 216 are shown, corresponding to five access levels. The access levels in the embodiment of FIG. 2.2, as previously, described are Senior Administrator ("Senior Admin"), Administrator ("Admin"), Middle Tier Servers, and Full User and User. Additionally, accessGroup objects for customer-defined subadministration groups may be provided, for example, accessGroup objects 216 labeled Group A and Group B in FIG. 2.2. Each of Group A and Group B accessGroup objects includes a corresponding groupofNames object 218. The groupofNames object is defined in the standard LDAP schema as summarized in RFC 2256.

Target groups container object 214, is the "anchor point" for the GSO-specific target groups. A GSO administrator may define groups of target types and give users access to those target groups. groupofNames objects 218 labeled Target Group A and Target Group B in FIG. 2.2, are used to define the target groups specified by the administrator. Although two target groups are illustrated in the scheme of FIG. 2.2, it would be understood by an artist of ordinary skill that this is exemplary, and in general, an embodiment of the present invention may have a number, n, of target groups defined. The GSO Domains container object is used as an "anchor point" for the GSO domains subtree. The GSO Domains container is a container object for a plurality of eGSODomain 220 objects that are used by GSO to determine the authentication domain for a specified location string. Within a multi-user networked computing environment, various authentication domains (administrative realms) may be implemented. These domains may be distinguished with combinations of identifiers and values. For example, identifiers may include host, application and application instance. A value associated with each of these then specifies a particular host, application, and application instance. The combination of identifiers and values are referred to as location strings. The eGSODomain object is used to configure the possible location strings valid for a particular domain. GSO uses the eGSODomain object to determine the authentication domain for a specified location string, and uses that to look up a users target record within that authentication domain.

The target accounts container object is used as the "anchor point" for the GSO specific target accounts. GSO may define and maintain accounts which may be shared between users, targets or both. For example, if a user defines a target of Telnet to access a particular machine and also defines a target of FTP for the same machine, they may, in an embodiment, in accordance with the principles of the present invention, share the same target account information. (Telnet and File-Transfer Protocol (FTP) are Internet protocols for network terminal emulation and file transfers, respectively.) The target accounts container object is a container for eGSOaccount objects 222. Although only a single eGSOaccount object 222 is illustrated in FIG. 2.2, for clarity, it would be understood by an artist of ordinary skill that the target accounts container may include one or more of eGSOaccount objects 222.

The eGSOaccount object is used by GSO to describe target account information which may be shared by multiple users or a cross multiple targets for a single GSO user, as previously indicated. The complete class definition for the eGSOaccount class is included in Appendix A.

The target service types container object is used as the "anchor point" for GSO-specific target service types. A target service type is a class of services representing a specific type. Examples might include Lotus Notes®, Netware and tn3270 terminal emulation. (Lotus Notes® is a registered trademark of Lotus Development Corporation.) Objects of the eTargetServiceType class may include a plurality of attributes which are specified in the corresponding object class table in Appendix A. The attribute specifications are provided in Appendix B, and for standard LDAP attributes, in the aforementioned RFC's, previously incorporated herein by reference.

The eTargetServiceType objects 224 includes a tsType attribute. The value of the tsType attributes indicates the type of target service for a GSO target. Other attributes which eTargetServiceType object 224 may contain have not been illustrated in FIG. 2.2 for simplicity. However, the object class definition for eTargetServiceType objects includes a list of attributes which such objects may contain. These are listed in Appendix A.

Instantiations of a particular target service type are described using objects 226 of the eTarget Service class. The full class definition is provided in the corresponding object class table, Appendix A. In FIG. 2.2, a single eTargetService object 226 is illustrated for simplicity, however, it would be understood that this is exemplary and an alternative embodiment may include a plurality of eTargetService objects 226. Furthermore, eTargetService objects 226 may include a plurality of attributes. Two attributes illustrated in FIG. 2.2 are the tsType discussed above, and the tsName attribute. The value of the tsName attribute is used to specify the name of the particular target service that is an instance of the corresponding target service type. An instance of a target service type might be, for example, tn3270 terminal emulation service to a particular data processing system. In eTargetService object 226 may also contain one or more eGSOattachment objects 208. These eGSOattachment objects may be used to provide additional data relative to a specific target service type, in the same way that they are used to provide additional data to target records, previously described in conjunction with FIG. 2.1.

In an embodiment in which the GSO schema in accordance with the principles of the present invention is a Java based implementation, an eTargetServiceType object 224 may contain one or more eTargetAdapter objects 228. An eTargetAdapter object 228 may include a plurality of attributes. The attribute list for an eTargetAdapter object is provided in the class definition included in Appendix A. Attributes may include a taName attribute, the value of which allows a user to specify the name of a target adapter. Target adapters are code used to access the specific target of the type specified by the value of the tsType attribute previously discussed in conjunction with eTargetServiceType 224. If the client itself is a pure Java client, then the target adapter code is the client itself. Otherwise, the target adapter code interfaces with the client code such as a command line executable or native code. An example of the last might be a native telnet tn3270 emulator that is called by Java glue code that constitutes the target adapter code. On the other hand, a pure Java tn3270 emulator that runs in a browser, for example, represents a pure Java client that may itself embody the target adapter code. Additionally, an eTargetAdapter object 228 may include a javaClassName attribute. This attribute is used to indicate the java class name which GSO uses to access the specific target. The definitions of the taName and javaClassName attributes, as well as the other attributes that an eTargetAdapter object may include and not illustrated on FIG. 2.2 for simplicity, are included in the attribute tables, Appendix B.

Similar to eTargetService objects 226 and eTargetRecord objects 206, an eTargetAdapter object 228 may include one or more eGSOAttachment objects 208. As previously described, eGSOattachment objects 208 are used to provide additional data relevant to, in this instance, a specific target adapter. For example, if the target service type is a telnet tn3270 emulation, (corresponding, for example, to a tsType attribute value of "3270") to log a user into the session, the service has to be aware of the logon panel to use. An instance of eGSOAttachment object 208 may be used to describe the panel, that is, the respective fields therein, so that the GSO can properly pass the user name and password.

An eObjectDescription object 230 is provided to describe additional information about identifiers where attachments associated with an eTargetServiceType object or an eTargetAdapter object. The information within an eObjectDescription object, allows detailed information to be associated with these objects, for example, descriptive text which can be presented to a graphical user interface (GUI). For example, text that may be displayed to a user in a native language. By using the stored text in the eObjectDescription object associated with the eTargetServiceType defining the corresponding native language service, the appropriate text is displayed. A plurality of attributes may be included in an eObjectDescription object 230. These are listed in the corresponding class definition in Appendix A. Attributes that may be contained by an eObjectDescription object 230 include the required and editable attributes. These take Boolean values which indicate whether the object is required or if it is editable by the user. An eObjectDescription object 230 may also include an objectClassCaption attribute defined in Appendix B.

The Password Generators container object is used as the "anchor point" for the GSO-specific ePasswordGenerator objects 232. The ePassword Generator objects 232 describe the generator information used for targets which are configured to use a generated password instead of a fixed password. Generated passwords mitigate against security compromise by interception of a user's password. An ePasswordGenerator object 232 describes the algorithm used to dynamically generate a password each time a user logs on. (A dynamically generated password may also be called a passticket or a token.) The algorithm is also available to the host, or target. The token is generated using the algorithm in response to an encryption key as well as the UID and, in particular embodiments, other information, such as a client machine identifier. Additionally, dynamic information, for example the time of day is used so that the token is different each time the user logs on. The host and client both generate the token using the same information and algorithm. The client passes the token so generated to the host, and if the two tokens compare, access to the host is granted.

Attributes which may be contained by an eObjectGenerator object 232 include the secret Key attribute. The value of the secret Key attribute contains an encryption key used in the generation of a pass ticket or password. The mechanism used for the encryption may be application specific and may be indicated within the key itself. The definition of the secretKey attribute is included in the attribute tables appearing in Appendix B.

An ePasswordGenerator object 232 may also contain a groupofNames object 218. The groupofNames object 218 may include attributes, such as the targetuid, whose values represent information needed to generate the token.

Referring now to FIG. 2.3, there is illustrated therein Computers portion 240 of an LDAP GSO schema in accordance with the principles of the present invention. An eComputerSystem object 242 is used to represent either a single computer system or a class of computer systems within the GSO. If an eComputer System object 242 does not yet exist, when a computer system is defined by GSO, it will be created. An eComputerSystem object 242 represents an object type defined by the CIM. The eComputerSystem object is derived from the CIM. Within the CIM Core Specification, incorporated herein by reference, is defined a CIMComputerSystem object upon which eComputerSystem 242 is based.

An eComputerSystem object 242 may be associated with one or more eSoftware objects 244 (in FIG. 2.3, only a single eSoftware object is shown for simplicity). The eSoftware objects 244 may be derived from the CIMLogicalElement defined in the CIMCore schema specification. An eSoftware object 244 may include one or more attributes. Attributes which an eSoftware object may include are listed in the eSoftware object definition included in Appendix A. The software attribute, which may contain as a value a name used to identify software object entries, is shown in FIG. 2.3; other attributes that may be included have been omitted for clarity. Recall that attributes that an eSoftware object may contain, include those attributes derived from superclasses of the object. Definitions of attributes not so derived are included in Appendix B. Associated with an eSoftware object 244 may be an eGSOmachineProfile object 246. The eGSOmachineProfile object is used in GSO to describe GSO-specific information about the computer system specified by using the eComputer System object 242 discussed herein above. An eGSOmachineProfile 246 may include a plurality of attributes. These attributes are listed in the class definition corresponding to the eGSOmachineProfile object class in Appendix A. An eGSOmachineProfile object 246 may have one or more eGSOattachment objects 208 which represent GSO-specific files or locations of files for targets. eGSOattachment objects 208 have been previously discussed in conjunction with FIGS. 2.1 and 2.2.

Figure 3:
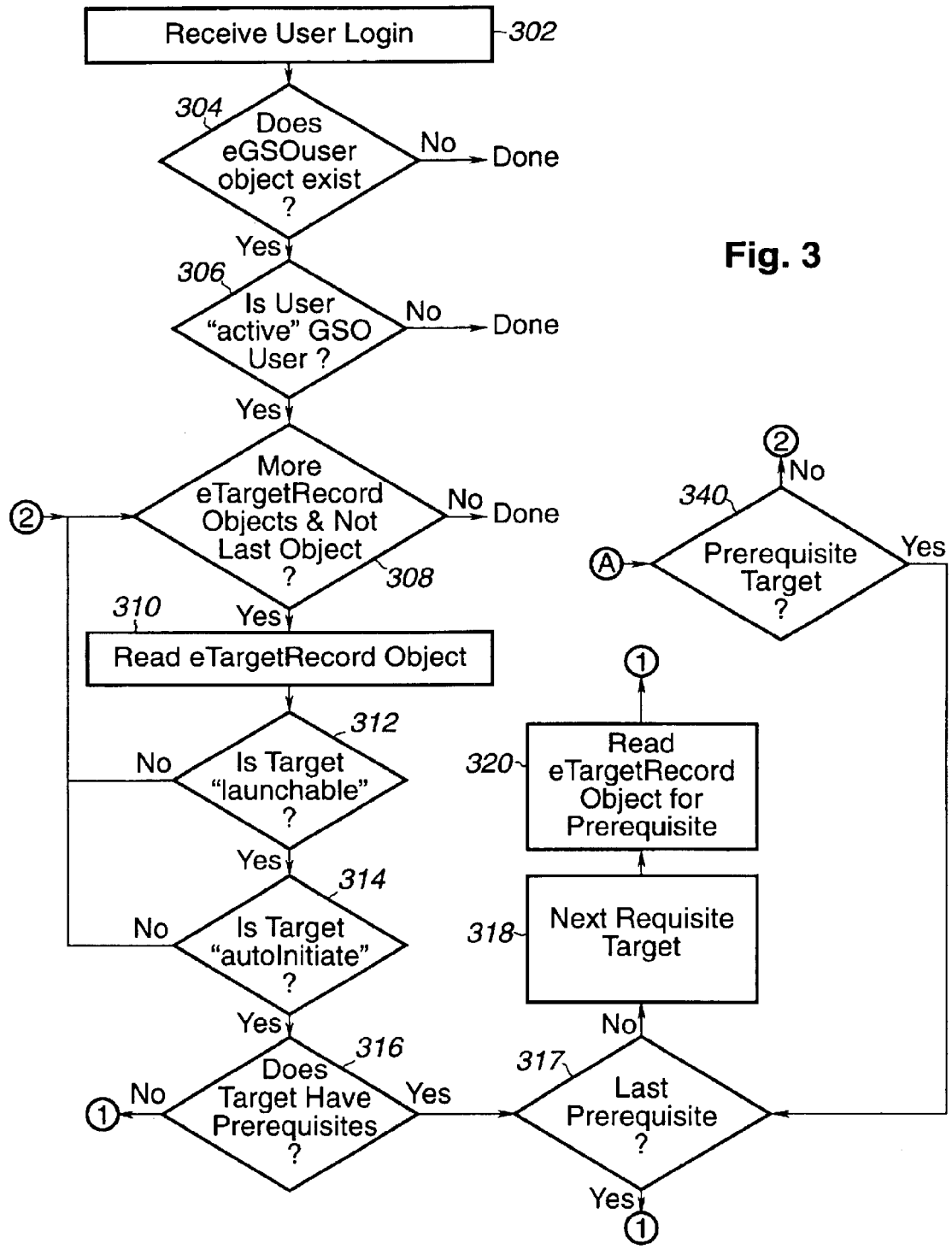
FIG. 3 illustrates, in flowchart form, a global sign-on (GSO) methodology in accordance with an embodiment of the present invention.
Figure 3:
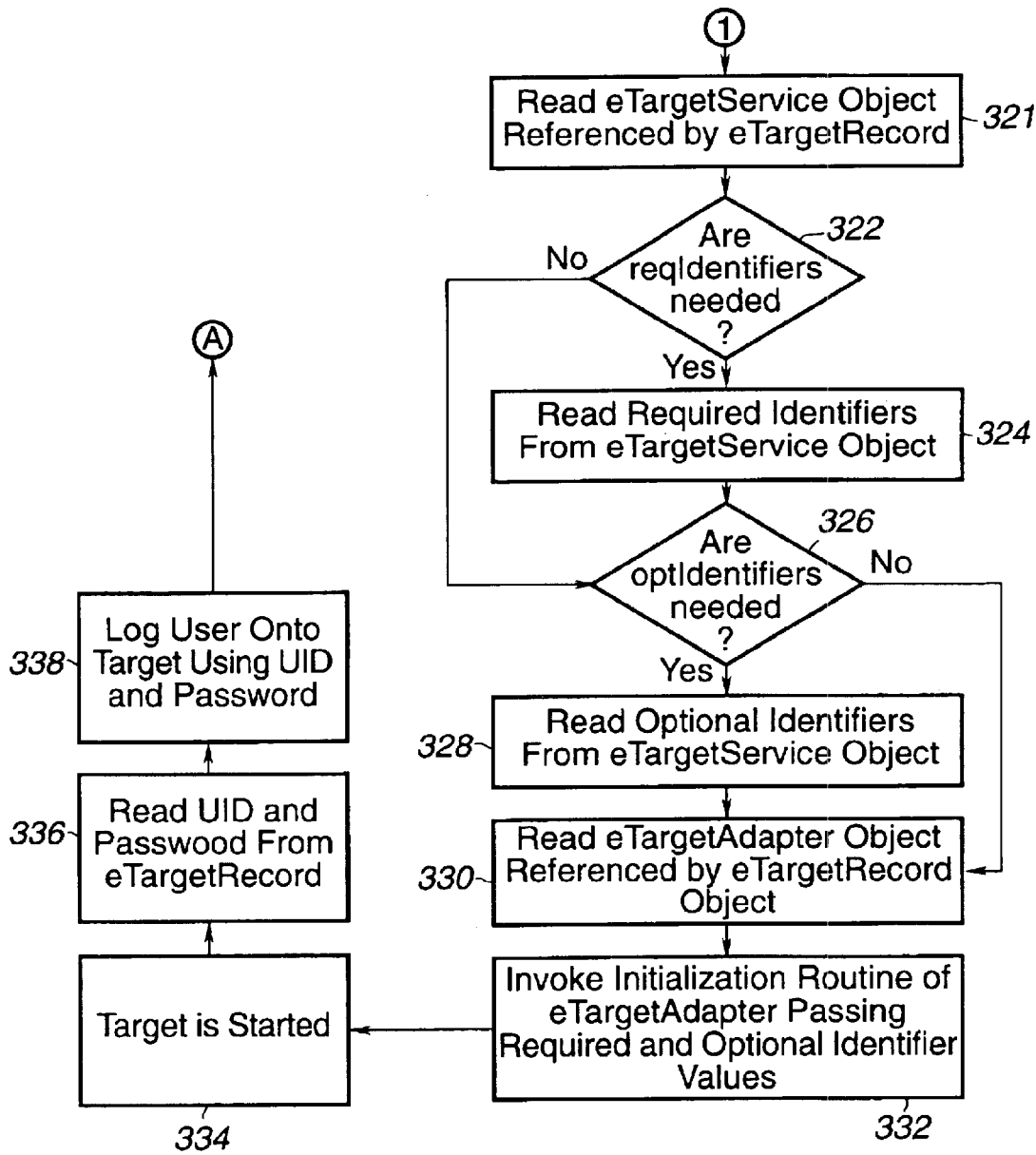

Refer now to FIG. 3 illustrating a GSO methodology 300 using the GSO LDAP schema according to the principles of the present invention. In step 302, user login is received. In step 304 it is determined for an instantiation of an eGSOuser object corresponding to the user whose login is received in step 302 exists. If not, the user is not enabled for GSO and methodology 300 terminates. Note that in an embodiment of the present invention in which eGSOuser objects are implemented in accordance with the schema illustrated in FIG. 2.1, corresponding to an eGSOuser object 202, an instantiation of the eGSOuser object with the value of the cn attribute corresponding to the name of the user will exist. Then, step 304 proceeds by the "Yes" branch, and in step 306 it is determined if the user is an "active" GSO user. In an embodiment in accordance with the schema illustrated in FIG. 2.1, step 306 may be performed by retrieving the value of the userState attribute. As previously discussed, and as shown in the attribute definition, Appendix B, possible values for the userState attribute may be "Enabled" and "Disabled". If, in such an embodiment, the value is determined in step 306 to be "Disabled", then the user is not an active GSO user and step 306 proceeds by the "No" branch, and methodology 300 terminates. Conversely, if the value is "Enabled" then in step 306 is an active GSO user, and methodology 300 proceeds to step 308.

In step 308 it is determined if the eGSOuser object as determined in step 304 includes any eTargetRecord objects. If not, methodology 300 terminates (the "No" branch in step 308.) Otherwise, in step 310 the next eTargetRecord is read. Recall that, as discussed in conjunction with FIG. 2.2, an eGSOuser object may contain one or more eTargetRecords, corresponding to the number of targets for which a particular target is GSO enabled. By looping over the eTargetRecord objects, steps 308–340, methodology 300 logs the particular user under multiple targets as will now be described in further detail.

In step 312, it is determined if the target corresponding to the eTargetRecord object record read in step 310 is "launchable". This may be determined in an embodiment in accordance with the GSO schema illustrated in FIGS. 2.1–2.3 by referring to the launchable attribute in the eTargetRecord. As described in Appendix B, the launchable attribute may take Boolean values, whereby a launchable target is represented by a "True" value for the launchable attribute, and "False" otherwise. If the target is not launchable, step 312 proceeds by the no branch to loop to the next eTargetRecord.

If, however, in step 312 the target is launchable, it is then determined in step 314 if the target is an auto initiated target. The eTargetRecord read in step 310 may include an auto-Initiate attribute that may take a Boolean value. If the value of the autoInitiate attribute is "TRUE" then the corresponding target should be launched when the GSO user logs on. If, however, the value of the autoInitiate attribute is "FALSE" then step 314 follows the "No" branch and returns to step 308.

If, however, in step 314 the target may be auto initiated, then it is determined in step 316 if the target has prerequisites, and if the last prerequisite has not been handled. Prerequisite targets are listed in a prereqTarget attribute in the eTargetRecord read in step 310. If the target corresponding to the eTargetRecord read in step 310 includes prerequisite targets then methodology 300 loops over the prerequisite targets by proceeding to step 318 to obtain the name of the next prerequisite target in the prereqTarget attribute. In step 320, the eTargetService object for the corresponding prerequisite target is read. Recall that an eTargetService object, such as an eTargetService object 226 discussed in conjunction with FIG. 2.2, may include a reqIdentifier attribute, the values of which specify required identifiers for the corresponding GSO target. If the target has any required identifiers, the required identifiers are read from the eTargetService object in step 324. Otherwise, step 324 is bypassed. Similarly, in step 326 it is determined if the target specifies optional identifiers. If so, in step 328, the optional identifiers are read from the eTargetService object, step 328. If, conversely, the target does not include optional identifiers, step 328 is bypassed.

In step 330, the eTargetAdapter object referenced by the eTargetRecord object for the current target is read. Recall that the eTargetAdapter object 228 in an embodiment in accordance with FIG. 2.2, describes the interface code which GSO uses to access the current target. In step 322, the initialization routine of the eTargetAdapter read in step 330 is invoked, passing required and optional identifier values, if any, retrieved in steps 324 and 328, respectively.

In step 334, the target is started. The value of the uid attribute and userPassword attribute are read from the corresponding eTargetRecord, in step 336. The values of the uid and userPassword attributes respectively contain the user identifier and password for the active GSO user initiating the login in step 302. In step 338, the user is logged into the target using the values of the uid and userPassword attributes retrieved in step 336. If the current target is a prerequisite target, in step 340, step 340 proceeds by the yes branch to step 317. If, however, in step 340 the current target was not a prerequisite target, methodology 300 returns to step 308 to process the next eTargetRecord object.

In this way, a GSO may be provided. The GSO implemented in accordance with the present invention rests on a set of data structures built on a schema derived from the open architecture LDAP.

Although the present invention and its advantages have been described in detail, it should be understood that various changes, substitutions and alterations can be made herein without departing from the spirit and scope of the invention as defined by the appended claims.

Appendix A - Object Class Tables

| Class | eGSOuser |
| --- | --- |
| Description | Contains GSO user specific information |
| Type | structural |
| OID | 1.3.18.0.2.6.27 |
| Derived from | eUser |
| Auxiliary Classes | |
| Possible Superiors | person, organizationalPerson, inetOrgPerson, residentialPerson, liPerson, ePerson, container |
| Must Contain | cn[RDN], userType, userState |
| Inherited Must Contain | |
| May Contain | associatedName, subadminGroup, targetGroup |
| Inherited May Contain | caption, description, principalName, userCertificate, configPtr, accessHint, accountHint |
| Additional Description: | |
| The eGSOuser object is structurally always "below" an "ePerson" and represents the association between a person object and GSO, when that person is configured to be a GSO user. The eGSOuser object contains specific GSO information associated with that user and is also used as an anchor point to which the GSO user's target information is attached. If a GSO user is being created and no ePerson object yet exits in the namespace for that person, GSO will create an ePerson (inetOrgPerson and ePerson auxiliary class) for that new person and will populate only the cn, sn and userPassword attributes. When a "GSO user" is deleted, the eGSOuser subtree will be removed from the ePerson object (breaking the association between the person and GSO). If there are no more entries "below" the ePerson object, the user will be given the opportunity to also delete the ePerson object itself, if they wish. | |

| Class | container |
| --- | --- |
| Description | Anchor points for GSO subtrees |
| Type | structural |
| OID | 1.3.18.0.2.6.28 |
| Derived from | top |
| Auxiliary Classes | |
| Possible Superiors | any structural object |
| Must Contain | cn[RDN] |
| Inherited Must Contain | |
| May Contain | |
| Inherited May Contain | |
| Additional Description: | |
| This object exists in the eNetwork common schema definition. It is included here to document its use by GSO. GSO maintains several anchor points (subtrees) within its GSO-specific data. All the anchor points use the container object as the anchor point object and the Common Name in the container indicates the type of GSO subtree. | |

| Class | eTargetRecord |
| --- | --- |
| Description | Used to describe the specific target information for this GSO user. |
| Type | structural |
| OID | 1.3.18.0.2.6.29 |
| Derived from | cimSetting |
| Auxiliary Classes | |
| Possible Superiors | eGSOuser |
| Must Contain | cn[RDN] |
| Inherited Must Contain | |
| May Contain | uid, userPassword, tsType, accountService, targetService, targetAdapter, reqIdentifier, optIdentifier, passwordGenerator, launchable, prereqTarget, autoInitiate, autoTerminate |
| Inherited May Contain | caption, description, sid |
| Additional Description: | |
| The eTargetRecord object describes the target that the GSO user may launch. It is used as the association between the user and the specific target information which applies to the target type. | |

-continued

Appendix A - Object Class Tables

| Class | eApplicationSystem for GSO |
|---|---|
| Description | Anchor point for the GSO-specific object tree |
| Type | structural |
| OID | 1.3.18.0.2.6.84 |
| Derived from | eSystem |
| Auxiliary Classes | |
| Possible Superiors | organization, organizationalUnit, domain, eSystem (and its subclasses) |
| Must Contain | |
| Inherited Must Contain | |
| May Contain | hostedSoftwarePtr, osPtr |
| Inherited May Contain | caption, description, installDate, configPtr, systemName[RDN], nameFormat, systemRoles, primaryOwnerContact, primary OwnerName |

Additional Description:
The eApplicationSystem for GSO is the anchor point for the remainder of the GSO-specific object tree. It is created by GSO when the product is first installed and configured. GSO then populates the remainder of its GSO-specific object tree beneath this anchor point. The "owner" of this anchor point is the GSO Senior Admin group and this ownership propagates through the rest of the GSO-specific object tree. The GSO Admin and Middle Tier server groups have access to this anchor point and this access also propagates through the remainder of the GSO-specific object tree.

| Class | eGSOaccount |
|---|---|
| Description | Contains account information for GSO targets |
| Type | structural |
| OID | 1.3.18.0.2.6.31 |
| Derived from | eAccount |
| Auxiliary Classes | |
| Possible Superiors | Target Accounts container |
| Must Contain | cn[RDN] |
| Inherited Must Contain | uid |
| May Contain | accountService, otherPrincipalPtr |
| Inherited May Contain | caption, description, host, I, o, ou, seeAlso, userPassword, userCertificate, principalPtr |

Additional Description:
The eGSOaccount is used by GSO to describe target account information which may be shared by multiple users or across multiple targets for a
single GSO user. GSO maintains these eGSOaccount objects within the Target Accounts GSO-specific subtree. GSO defines and maintains accounts which may be shared between users and/or targets. For example, if a user defines a target of telnet to access an AIX machine and also defines a target of ftp for the same AIX machine, they would likely share the same target account information. That account information is maintained within this subtree.

| Class | eTargetServiceType |
|---|---|
| Description | GSO Target Service Type |
| Type | structural |
| OID | 1.3.18.0.2.6.32 |
| Derived from | top |
| Auxiliary Classes | |
| Possible Superiors | Target Service Types container. |
| Must Contain | tsType[RDN] |
| Inherited Must Contain | |
| May Contain | caption, description, authenticationType, capability, reqIdentifierName, optIdentifierName, msgFileName |
| Inherited May Contain | |

Additional Description:
The eTargetServiceType class is used to describe a type of a GSO Target Service. These objects are maintained within the GSO-specific object subtree beneath the Target Service Types anchor point. A Target Service Type is a class of services representing a specific type. Examples might be: Lotus Notes, Netware, 3270 etc. The eTargetServiceType indicates the required and optional identifiers needed to describe this Target Service Type as well as the capabilities and authentication type supported by this Target Service Type. Below this class are defined eTargetService objects representing specific instances of this Target Service Type as Type as well as eTargetAdapter objects which describe the adapters (interface code) to access that eTargetService instance. In the instantiation of a specific eTargetService, the required and optional identifiers are specified with their values for that target. The eTargetAdapter object represents the Java code which GSO uses to interface with that target.

| Class | eTargetService |
|---|---|
| Description | GSO Target Service |
| Type | structural |
| OID | 1.3.18.0.2.6.33 |
| Derived from | top |
| Auxiliary Classes | |
| Possible Superiors | eTargetServiceType |
| Must Contain | tsName[RDN], tsType |
| Inherited Must Contain | |
| May Contain | caption, description, authenticationType, reqIdentifier, optIdentifier |
| Inherited May Contain | |

Additional Description:
The eTargetService class is used to describe a specific instance of a GSO Target Service Type. These objects are maintained within the GSO-specific object subtree beneath a defined TargetServiceType. An eTargetService is a class describing a specific instance of an eTargetServiceType. Examples might be: Lotus Notes, Netware, 3270 to AUSVMR, etc. This is an instatiation of a specific Target Service Type and would have the values for the required and optional identifiers (as indicated in the eTargetService Type) specified.

| Class | eTargetAdapter |
|---|---|
| Description | GSO Target Adapter |
| Type | structural |
| OID | 1.3.18.0.2.6.34 |
| Derived from | top |
| Auxiliary Classes | |
| Possible Superiors | eTargetServiceType. |
| Must Contain | taName[RDN], tsType, javaClassName |
| Inherited Must Contain | |
| May Contain | caption, description, jarFileName, osType, propertyType, msgFileName |
| Inherited May Contain | |

Additional Description:
The eTargetAdapter class is used to describe the interface code which GSO uses to access the specified target. These objects are maintained within the GSO-specific object subtree beneath a specified eTargetServiceType. The eTargetAdapter is the Java interface code which GSO will invoke via the dynamic Target Interface to access the specified target. The Target Adapter code is either the client itself (in the case of a pure Java client such as Host on Demand), or it interfaces with the client code such as a command line executable or native code.

| Class | eGSOattachment |
|---|---|
| Description | GSO attachment to contain or describe additional files or data that are needed. |
| Type | structural |
| OID | 1.3.18.0.2.6.35 |
| Derived from | eProperty |
| Auxiliary Classes | |
| Possible Superiors | eTargetRecord, eTargetService, eTargetAdapter, eGSOmachineProfile. |
| Must Contain | propertyType[RDN] |
| Inherited Must Contain | |
| May Contain | |
| Inherited May Contain | caption, description, cisPropertyType, cesPropertyType, binPropertyType, cisProperty, cesProperty, binProperty |

Additional Description:
The eGSOattachment class is used by GSO to provide additional data -continued Appendix A - Object Class Tables relevant to a specific Target Record, Target Service Type, Target Adapter or Machine Profile. The attachment data is usually additional files or information needed by the target or machine. For example, for a Lotus Notes target, the notes.ini file is required. These objects are maintainedin with the GSO-specific object subtree beneath a specified eTargetRecord, eTargetServiceType, eTargetAdapter or beneath the eGSOmachineProfile.

| Class | eComputerSystem |
|---|---|
| Description | Based on CIM_ComputerSystem, this structural class represents a computer system or "class" of machines. |
| Type | structural |
| OID | 1.3.18.0.2.6.36 |
| Derived from | eSystem |
| Auxiliary Classes | |
| Possible Superiors | organization, organizationalUnit, domain, eSystem (and its subclasses) |
| Must Contain | |
| Inherited Must Contain | |
| May Contain | location, hostname[RDN] |
| Inherited May Contain | caption, description, installDate, configPtr, systemName, nameFormat, systemRoles, primaryOwnerContact, primaryOwnerName |

Additional Description:
The eComputersystem is used to represent either a single computer system or a "class" of computer systems. If this object does not yet exist when a computer system is defined by GSO, it will be created. Below this object, GSO will create an eSoftware for GSO object to represent GSO-specific aspects of this computer system, below which will be the eGSOmachineProfile object to contain the GSO-specific machine information.

| Class | eSoftware for GSO. |
|---|---|
| Description | Based on CIM, this structural class is used to re-present instances of software on a machine. |
| Type | structural |
| OID | 1.3.18.0.2.6.86 |
| Derived from | cimLogicalElement |
| Auxiliary Classes | |
| Possible Superiors | eCompuerSystem, eSystem |
| Must Contain | |
| Inherited Must Contain | |
| May Contain | |
| Inherited May Contain | caption, description, installDate, configPtr, software [RDN], vendor, identifyingNumber, version, softwareElementState, softwareElementID, osType, other OSTypeDescription, manufacturer, buildNumber, serialNumber, codeSet, identificationCode, languageEdition, labeledURI, localpath, supportingFiles, applSystemHint, applSoftwareHint |

Additional Description:
The eSoftware for GSO object is used to form a subtree of GSO-specific information about this computer system. The software attribute is set to "GSO". For GSO, a computer system can represent either a single computer system or a "class" of computer systems. If this object does not yet exist when a computer system is defined by GSO, it will be created beneath the eComputersystem object. Below the eSoftware object, GSO will create an eGSOmachineProfile object to represent GSO-specific aspects of this computer system.

| Class | eGSOmachineProfile |
|---|---|
| Description | Used to contain GSO-specific information about this computer system. |
| Type | structural |
| OID | 1.3.18.0.2.6.38 |
| Derived from | top |
| Auxiliary Classes | |
| Possible Superiors | eSoftware for GSO |
| Must Contain | cn[RDN], osType |
| Inherited Must Contain | |

-continued

Appendix A - Object Class Tables

| May Contain | caption, description, reqIdentifier |
|---|---|
| Inherited May Contain | |

Additional Description:
The eGSOmachineProfile is used by GSO to describe GSO-specific information about this computer system. For GSO, a computer system can represent either a single computer system or a "class" of computer systems. Below the eGSOmachineProfile, GSO may have eGSOattachment objects which represent GSO machine-specific files or locations of files for targets. The reqIdentifier attribute can be used to override GSO target service information which is specific to this computer system.

| Class | ePasswordGenerator |
|---|---|
| Description | Used to describe a GSO Password Generator. |
| Type | structural |
| OID | 1.3.18.0.2.6.39 |
| Derived from | top |
| Auxiliary Classes | |
| Possible Superiors | Password Generators container |
| Must Contain | cn[RDN], secretKey |
| Inherited Must Contain | |
| May Contain | caption, description, member |
| Inherited May Contain | |
| Special Notes | |

Additional Description:
The ePasswordGenerator object is used by GSO to describe the information needed for a specific Password Generator. This object is within the GSO-specific object subtree beneath the Password Generators container anchor point. The GSO Password Generator objects describe the generator information used for those targets (such as 3270 passticket) which are configured to use a generated password instead of a fixed password. Only GSO Senior Administrators are allowed to create or modify Password Generators and only GSO Middle Tier Servers are allowed to read the Password Generator information.

| Class | eObjectDescription |
|---|---|
| Description | Used to describe more information about an object for usability and to indicate whether the object is required or user-editable. |
| Type | structural |
| OID | 1.3.18.0.2.6.40 |
| Derived from | top |
| Auxiliary Classes | |
| Possible Superiors | eTargetServiceType, eTargetAdapter |
| Must Contain | cn[RDN] |
| Inherited Must Contain | |
| May Contain | caption, description, objectClassCaption, validValues, required, editable, msgFileName |
| Inherited May Contain | |

Additional Description:
The eObjectDescription object is used by GSO to describe additional information about the identifiers or attachments associated with an eTargetServiceType or eTargetAdapter. This object is within the GSO-specific object subtree beneath the Target Service Types container anchor point. The information within this object allows detailed information to be associated with these objects, for example descriptive text which can be presented to a GUI user. The object description also contains attributes used to indicate whether the object is required, or if it is editable by the user.

| Class | eGsoDomain |
|---|---|
| Description | Used to described location identifiers and their values corresponding to an authentication domain. |
| Type | structural |
| OID | 1.3.18.0.2.6.41 |
| Derived from | top |
| Auxiliary Classes | |
| Possible Superiors | GSO Domains container. |

Appendix A - Object Class Tables (continued)

| | |
|---|---|
| Must Contain | cn[RDN] |
| Inherited Must Contain | |
| May Contain | caption, description, targetLocation |
| Inherited May Contain | |

Additional Description:
The eGsoDomain object is used by GSO to determine the authentication Domain for a specified location string. This object is within the GSO-specific object subtree beneath the GSO Domains container anchor point. Within a multiuser networked computing environment, various authentication domains (administrative realms) may exist. These domains may be distinguished with combinations of identifiers and values for Host, Application and Application Instance. These combinations of identifiers and values are referred to as location strings. This object is used is used to configure the possible location strings valid for a given Domain. GSO uses this object to determine the authentication Domain for a specified location string, and uses that to look up a user's Target Record within that authentication Domain.

APPENDIX B

Attribute Tables

| Attribute | userType |
|---|---|
| Description | Indicates the type of user. Possible values which GSO will use are: SeniorAdmin, Admin, Middle Tier Server, Full User, User |
| OID | 1.3.18.0.2.4.123 |
| Syntax | cis[1] 1/128 |
| Single Valued | Single Valued |
| Access Class | sensitive |

Additional Description:
This attribute is used by GSO to track the type of GSO principal. Although
this is "role-like", the types tracked are GSO specific and not managed via LDAP mechanisms. GSO administers the type of user and for
performance reasons, another LDAP access should not be required to ascertain the user type.

[1]CIS = case ignore string

| Attribute | userState |
|---|---|
| Description | Indicates the current state for the user. GSO possible values are: Enabled, Disabled |
| OID | 1.3.18.0.2.4.124 |
| Syntax | cis/128 |
| Single Valued | Single Valued |
| Access Class | sensitive |

Additional Description:
This attribute is used to track the state for the principal. GSO uses this attribute to indicate whether the GSO user information is currently enabled or disabled. This allows the GSO user to be inactivated and not have to delete the definition.

| Attribute | subadminGroup |
|---|---|
| Description | Indicates the subadministration groups to which this GSO principal belongs. |
| OID | 1.3.18.0.2.4.125 |
| Syntax | dn/1000 |
| Single Valued | Multi-Valued |
| Access Class | sensitive |

Additional Description:
This attribute is used to track the subadministration groups to which this GSO user belongs.

APPENDIX B-continued

Attribute Tables

| Attribute | targetGroup |
|---|---|
| Description | Indicates the Target Groups to which this GSO principal belongs. |
| OID | 1.3.18.0.2.4.126 |
| Syntax | dn/1000 |
| Single Valued | Multi-Valued |
| Access Class | sensitive |

Additional Description:
This attribute is used to track the Target Groups to which this GSO user belongs.

| Attribute | prereqTarget |
|---|---|
| Description | Indicates a list of targets which are prerequisites of this target. 1.3.18.0.2.4.127 |
| Syntax | dn/1000 |
| Single Valued | Multi-Valued |
| Access Class | normal |

Additional Description:
This attribute is used to indicate a list of targets which are prerequisites of this target. This allows targets to be started prior to this target, if the other targets are required to be running before this target can be launched.

| Attribute | autoInitiate |
|---|---|
| Description | Indicates that this target should be started/launched when the GSO user logs on. |
| OID | 1.3.18.0.2.4.128 |
| Syntax | boolean |
| Single Valued | Single-Valued |
| Access Class | normal |

Additional Description:
This attribute appears in an eTargetRecord object and indicates whether this target should be started/launched when the GSO user logs on.

| Attribute | autoTerminate |
|---|---|
| Description | Indicates that this target should be stopped when the GSO user logs off. |
| OID | 1.3.18.0.2.4.129 |
| Syntax | boolean |
| Single Valued | Single-Valued |
| Access Class | normal |

Additional Description:
This attribute appears in an eTargetRecord object and indicates whether this target should be stopped when the GSO user logs off.

| Attribute | accountService |
|---|---|
| Description | Indicates the service which is used to manage the target account. |
| OID | 1.3.18.0.2.4.130 |
| Syntax | dn/1000 |
| Single Valued | Single-Valued |
| Access Class | normal |

Additional Information:
This attribute is used to indicate the Target Service which manages the account for this GSO target. This allows the account service to be different than the target type itself. For example, the target type might use telnet to access an AIX machine, but the service which manages the account may be DCE, when integrated login is in effect.

| Attribute | targetService |
|---|---|
| Description | Indicates the target service instance. |
| OID | 1.3.18.0.2.4.131 |
| Syntax | dn/1000 |

APPENDIX B-continued

Attribute Tables

| | |
|---|---|
| Single Valued | Single-Valued |
| Access Class | normal |

Additional Information:
This attribute is used to indicate the Target Service instance for this GSO target.

| Attribute | tsType |
|---|---|
| Description | Indicates the target service type. |
| OID | 1.3.18.0.2.4.132 |
| Syntax | cis/128 |
| Single Valued | SingleValued |
| Access Class | normal |

Additional Description:
This attribute is used to indicate the type of Target Service used for this GSO target.

| Attribute | targetAdapter |
|---|---|
| Description | Indicates the specific target adapter to use for this GSO target |
| OID | 1.3.18.0.2.4.133 |
| Syntax | dn/1000 |
| Single Valued | SingleValued |
| Access Class | normal |

Additional Description:
This attribute is used to indicate the specific Target Adapter for this GSO target. The Target Adapter is the Java interface code which GSO will invoke via the Dynamic Target Interface to access the specified target. The Target Adapter code is either the client itself (in the case of a pure Java client such as Host on Demand), or it interfaces with the client code such as a command line executable or native code.

| Attribute | reqIdentifierName |
|---|---|
| Description | Indicates the set of Required Identifiers needed for this specific GSO Target Service Type. |
| OID | 1.3.18.0.2.4.134 |
| Syntax | cis/128 |
| Single Valued | Multi-Valued |
| Access Class | normal |

Additional Description:
This attribute is used to identify the set of Required Identifiers for this GSO Target Service Type. The required identifiers and their values will be acquired from the specific Target Service instance used by this target or by the user's Target Record.

| Attribute | reqIdentifier |
|---|---|
| Description | Indicates the set of Required Identifiers and their values needed for this specific GSO target. |
| OID | 1.3.18.0.2.4.135 |
| Syntax | cis/128 |
| Single Valued | Multi-Valued |
| Access Class | normal |

Additional Description:
This attribute is used to identify the set of Required Identifiers and their values for this GSO target. The required identifiers and their values will be acquired from the specific Target Service instance used by this target or from the user's Target Record.

| Attribute | optIdentifierName |
|---|---|
| Description | Indicates the set of Optional Identifiers needed for this specific GSO target. |
| OID | 1.3.18.0.2.4.136 |
| Syntax | cis/128 |

APPENDIX B-continued

Attribute Tables

| | |
|---|---|
| Single Valued | Multi-Valued |
| Access Class | normal |

Additional Description:
This attribute is used to identify the set of Optional Identifiers for this GSO Target Service Type. The optional identifiers and their values will be acquired from the specific Target Service instance used by this target or the user's Target Record.

| Attribute | optIdentifier |
|---|---|
| Description | Indicates the set of Optional Identifiers and their values needed for this specific GSO target. |
| OID | 1.3.18.0.2.4.137 |
| Syntax | cis/128 |
| Single Valued | Multi-Valued |
| Access Class | normal |

Additional Description:
This attribute is used to identify the set of Optional Identifiers and their values for this GSO target. The optional identifiers and their values will be acquired from the specific Target Service instance used by this target or from the user's Target Record.

| Attribute | passwordGenerator |
|---|---|
| Description | Indicates the name of the Password Generator to use for this specific GSO target. |
| OID | 1.3.18.0.2.4.138 |
| Syntax | dn/1000 |
| Single Valued | Single-Valued |
| Access Class | critical |

Additional Description:
This attribute is used to identify the Password Generator to use for this GSO target. For targets such as 3270 which have been configured to use a generated password for the target, this attribute specifies the Password Generator to use for this GSO target.

| Attribute | launchable |
|---|---|
| Description | Indicates whether this GSO target can be started by GSO or not. |
| OID | 1.3.18.0.2.4.139 |
| Syntax | Boolean |
| Single Valued | Single-Valued |
| Access Class | normal |

Additional Description:
This attribute is used to indicate whether a GSO target may be started via GSO or not. GSO targets described by eTargetRecord objects may be configured to be launchable or not.

| Attribute | principalPtr |
|---|---|
| Description | Indicates the names of the primary GSO users for this account. |
| OID | 1.3.13.0.2.4.319 |
| Syntax | dn/1000 |
| Single Valued | Multi-Valued |
| Access Class | normal |

Additional Description:
This attribute is used to identify the GSO users who have update authority for this Target Account. This allows GSO to maintain the users of a shared account so that the account can have the appropriate access control.

| Attribute | otherPrincipalPtr |
|---|---|
| Description | Indicates the names of the non-primary GSO users for this account. |
| OID | 1.3.18.0.2.4.141 |
| Syntax | dn/1000 |

APPENDIX B-continued

Attribute Tables

| Single Valued | Multi-Valued |
|---|---|
| Access Class | normal |

Additional Description:
This attribute is used to identify the GSO users who do not have update authority for this Target Account. This allows GSO to maintain the users of a shared account so that the account can have the appropriate access control.

| Attribute | tsName |
|---|---|
| Description | Used to specify the name of an eTargetService object |
| OID | 1.3.18.0.2.4.142 |
| Syntax | cis/128 |
| Single Valued | |
| Access Class | normal |

Additional Description:
This attribute is used to name an eTargetService object. GSO allows the user to specify the name of a Target Service, which is an instance of a specific Target Service Type.

| Attribute | taName |
|---|---|
| Description | Used to specify the name of an eTargetAdapter object. |
| OID | 1.3.18.0.2.4.143 |
| Syntax | cis/128 |
| Single Valued | |
| Access Class | normal |

Additional Description:
This attribute is used to name an eTargetAdapter object. GSO allows the user to specify the name of a Target Adapter, which describes the Java interface code to access the Target Service.

| Attribute | authenticationType |
|---|---|
| Description | Indicates the type of authentication used by this GSO Target Service. GSO specifies multiple possible values of: "Password", "Passticket", "Fingerprint," "Smartcard", "Tokencard" |
| OID | 1.3.18.0.2.4.144 |
| Syntax | cis/128 |
| Single Valued | Multi-Valued |
| Access Class | normal |

Additional Description:
This attribute is used to identify the type of authentication used by this GSO Target Service. Typical values are "Password" when a password is used or "Passticket" when a generated passticket is used.

| Attribute | capability |
|---|---|
| Description | Indicates the capabilities this GSO Target Service Type allows. |
| OID | 1.3.18.0.2.4.145 |
| Syntax | cis/128 |
| Single Valued | Multi-Valued |
| Access Class | normal |

Additional Description:
This attribute is used to identify the set of capabilities this GSO Target Service Type allows. Example values are: "login", "logoff", "change password", "start", "stop", etc. Because GSO supports dynamically defined targets and capabilities, this list may grow or shrink based on the specific Target Service Type.

| Attribute | javaClassName |
|---|---|
| Description | Indicates the name of the Java class which supports the GSO Dynamic Target Interface which GSO will use to access the target. |
| OID | 1.3.18.0.2.4.146 |
| Syntax | $ces^2$/256 |
| Single Valued | Single Valued |
| Access Class | normal |

Additional Description:
This attribute is used to indicate the Java class name which GSO will use to access the specific target. The class name specified must support the GSO Dynamic Target Interface. If the class specified is within a jar file, the jar file name should be specified using the jarFileName attribute.

$^2$CES = case exact string

| Attribute | jarFileName |
|---|---|
| Description | Indicates the name of the Java jar file which contains the Target Adapter class which supports the GSO Dynamic Target Interface which GSO will use to access the target. |
| OID | 1.3.18.0.2.4.147 |
| Syntax | ces/256 |
| Single Valued | Single Valued |
| Access Class | normal |

Additional Description.
This attribute is used to indicate the Java jar file name which contains the java class which GSO will use to access the specific target. The Java class name must be specified in the java className attribute within the targetAdapter object. The class name specified must support the GSO Dynamic Target Interface.

| Attribute | msgFileName |
|---|---|
| Description | Indicates the name of the message file which contains message strings used for displayable attributes (such as capability, objectClassCaption, validValues, etc. |
| OID | 1.3.18.0.2.332 |
| Syntax | ces/256 |
| Single Valued | Single Valued |
| Access Class | normal |

Additional Description:
This attribute is used to indicate a message file name which contains displayable/translatable strings for those attributes which are displayable. GSO uses this attribute in the eTargetServiceType and eTargetAdapter objects. The eTargetServiceType object contains the capability attribute which lists the capabilities of the Target Service Type. Both the eTargetServiceType and eTargetAdapter objects may have an associated eObjectDescription object which contains attributes for objectClassCaption and validValues. Both of those attributes indicate displayable strings. GSO stores the message keys in the displayable attributes and uses those keys to retrieve the proper displayable message string from the message file specified by the msgFilename attribute.

| Attribute | propertyType |
|---|---|
| Description | Indicates the type of GSO attachment. |
| OID | 1.3.18.0.2.4.320 |
| Syntax | cis/128 |
| Single Valued | Multi-Valued |
| Access Class | normal |

Additional Description:
This attribute indicates the types of attachments which may be attached to targetRecords, targetServices, targetAdapters or machineProfiles. GSO uses attachment objects to contain and describe extra files and information necessary for targets and machines.

| Attribute | cisPropertyType |
|---|---|
| Description | Indicates the type of data contained in a cisProperty. |
| OID | 1.3.18.0.2.4.310 |
| Syntax | cis/128 |

APPENDIX B-continued

Attribute Tables

| Single Valued | Multi-Valued |
|---|---|
| Access Class | normal |

Additional Description:
This attribute indicates the type of data contained in a GSO attachment which may be attached to eTargetRecords, eTargetServices, eTargetAdapters or eGSOmachineProfiles. GSO uses attachment objects to contain and describe extra files and information necessary for targets and machines.

| Attribute | cesPropertyType | |
|---|---|---|
| Description | Indicates the type of data contained in a cesProperty. | |
| OID | 1.3.18.0.2.4.308 | |
| Syntax | cis/128 | |
| Single Valued | Multi-Valued | |
| Access Class | normal | |

Special Notes
Additional Description:
This attribute indicates the type of data contained in a GSO attachment which may be attached to eTargetRecords, eTargetServices, eTargetAdapters or eGSOmachineProfiles. GSO uses attachment objects to contain and describe extra files and information necessary for targets and machines.

| Attribute | cisProperty | |
|---|---|---|
| Description | This attribute contains the data within a GSO attachment. | |
| OID | 1.3.18.0.2.4.309 | |
| Syntax | cis/250000 | |
| Single Valued | Multi-Valued | |
| Access Class | normal | |

Additional Description:
This attribute contains the actual non-binary data within an eGSOattachment. The type of data is indicated by the cisPropertyType attribute within the eGSOattachment object. GSO uses eGSOattachment objects to contain and describe extra files and information necessary fore targets and machines.

| Attribute | cesProperty | |
|---|---|---|
| Description | This attribute contains the data within a GSO attachment. | |
| OID | 1.3.18.0.2.4.307 | |
| Syntax | ces/250000 | |
| Single Valued | Multi-Valued | |
| Access Class | normal | |

Additional Description;
This attribute contains the actual non-binary data within an eGSOattachment. The type of data is indicated by the cesPropertyType attribute within the eGSOattachment object. GSO uses eGSOattachment objects to contain and describe extra files and information necessary for targets and machines.

| Attribute | binPropertyType | |
|---|---|---|
| Description | This attribute indicates the type of data within the binProperty attribute. | |
| OID | 1.3.18.0.2.4.306 | |
| Syntax | cis/128 | |
| Single Valued | Multi-Valued | |
| AccessClass | normal | |

Additional Description:
This attribute indicates the type of binary data within an eGSOattachment.

| Attribute | binProperty | |
|---|---|---|
| Description | This attribute contains the binary data within the eGSOattachment. | |
| OID | 1.3.18.0.2.4.305 | |
| Syntax | bin/250000 | |

APPENDIX B-continued

Attribute Tables

| Single Valued | Multi-Valued |
|---|---|
| AccessClass | normal |

Additional Description:
This attribute contains the binary data within an eGSOattachment. The type of the data is indicated by the binPropertyType attribute. This attribute can contain any sort of binary data which a GSO target may require when it is launched or an action (such as logon, logoff, change password, etc.) is performed.

| Attribute | secretKey | |
|---|---|---|
| Description | This attribute contains an encrypted key used in the generation of a passticket or password. | |
| OID | 1.3.18.0.2.4.155 | |
| Syntax | ces/256 | |
| Single Valued | Single-Valued | |
| Access Class | password | |

Additional Description:
This attribute contains an encrypted key used in the generation of a passticket or password. The mechanism used for the encryption is application specific and may be indicated within the key itself. For example, the key may be specified as: "(SHA)encryptedpassword" where {SHA} indicates the mechanism used to encrypt the password.

| Attribute | Key | |
|---|---|---|
| Description | This attribute contains a key (stored in clear text) used in the generation of a passticket or password. | |
| OID | 1.3.18.0.2.4.156 | |
| Syntax | ces/256 | |
| Single Valued | Single-Valued | |
| Access Class | password | |

Additional Description:
This attribute contains a clear text key used in the generation of a passticket or password.

| Attribute | keyLocation | |
|---|---|---|
| Description | This attribute contains an indication of where a key is to be found which can be used in the generation of a passticket or password. The location is represented in string format and can be used however the application wishes to indicate the key location (such as a DN string, file name, label in a table etc.) | |
| OID | 1.3.18.0.2.4.157 | |
| Syntax | ces/256 | |
| Single Valued | Single Valued | |
| Access Class | password | |

Additional Description:
This attribute contains a string which represents the location of a key used in the generation of a passticket or password. The application determines the meaning of this location string.

| Attribute | objectClassCaption | |
|---|---|---|
| Description | This attribute is used to associate a textual label with an object for display to an end user. | |
| OID | 1.3.18.0.2.4.158 | |
| Syntax | cis/128 | |
| Single Valued | Single-Valued | |
| Access Class | normal | |

Additional Description:
This attribute is used to provide a textual label for an object which can be displayed to an end user.

| Attribute | validValues |
|---|---|

APPENDIX B-continued

Attribute Tables

| Description | This attribute is used to contain possible values for an object. |
|---|---|
| OID | 1.3.18.0.2.4.159 |
| Syntax | cis/128 |
| Single Valued | Multi-Valued |
| Access Class | normal |

Additional Description:
This attribute is used to contain possible values for an object. This can provide a possible range allowed for an object or identifier for example. This information can be used for display to an end user.

| Attribute | required |
|---|---|
| Description | This attribute is used to indicate whether an object or attribute is required or not. |
| OID | 1.3.18.0.2.4.160 |
| Syntax | boolean |
| Single Valued | Single-Valued |
| Access Class | normal |

Additional Description:
This attribute is used to indicate whether an identifier is required or not.

| Attribute | editable |
|---|---|
| Description | This attribute is used to indicate whether an object or attribute is user editable or not. |
| OID | 1.3.18.0.2.4.161 |
| Syntax | boolean |
| Single Valued | Single-Valued |
| Access Class | normal |

Additional Description:
This attribute is used to indicate whether an identifier is user editable or not.

| Attribute | targetLocation |
|---|---|
| Description | This attribute is used to indicate a set of location strings to be used to determine which strings correspond to an authentication Domain. |
| OID | 1.3.18.0.2.4.162 |
| Syntax | cis/128 |
| Single Valued | Multi-Valued |
| Access Class | normal |

Additional Information:
This attribute is used to contain the set of valid location strings within an authentication Domain.

| Attribute | os Type |
|---|---|
| Description | CIM-derived attribute indicting type of operating system. |
| OID | 1.3.18.0.2.4.403 |
| Syntax | integer/11 |
| Single Valued | Single-Valued |
| Access Class | normal |

| Attribute | software |
|---|---|
| Description | Identifies software object entries. |
| OID | 1.3.18.0.2.4.327 |
| Syntax | cis/256 |
| Single Valued | |
| Access Class | normal |

What is claimed is:

1. A method for logging a user onto a target system and automatically starting a target application while only providing a single user identification and password comprising the steps of:

receiving a message from a client to log onto said target system to access said target application, wherein said message comprises a first user identification and a first password;

accessing a first entry in a Lightweight Directory Access Protocol (LDAP) directory associated with said client to authenticate said user of said client, wherein said first entry comprises a second user identification and a second password;

authenticating said user of said client if said first user identification and said first password matches said second user identification and said second password;

logging said user onto said tar-get system if said user is authenticated;

mapping to a second entry in said LDAP directory associated with said user if said user is authenticated, wherein said second entry comprises a credential associated with said target application, wherein said credential enables said target application to be automatically started; and automatically starting said target application by providing said credential to said target application if said user is authenticated.

2. The method as recited in claim 1, wherein said credential is associated with a group of resources.

3. The method as recited in claim 2, wherein said credential enables access to a group of target applications.

4. The method as recited in claim 1, wherein said LDAP directory comprises a plurality of entries, wherein one of said plurality of entries comprises an identification and a password associated with a unique user, wherein one of said plurality of entries comprises a credential associated with one or more target applications said unique user is authorized to access.

5. A computer program product embodied in a machine readable medium for logging a user onto a target system and automatically starting a target application while only providing a single user identification and password comprising the programming steps of:

receiving a message from a client to log onto said target system to access said target application, wherein said message comprises a first user identification and a first password;

accessing a first entry in a Lightweight Directory Access Protocol (LDAP) directory associated with said client to authenticate said user of said client, wherein said first entry comprises a second user identification and a second password;

authenticating said user of said client if said first user identification and said first password matches said second user identification and said second password;

logging said user onto said target system if said user is authenticated;

mapping to a second entry in said LDAP directory associated with said user if said user is authenticated, wherein said second entry comprises a credential associated with said target application, wherein said credential enables said target application to be automatically started; and automatically starting said target application by providing said credential to said target application if said user is authenticated.

6. The computer program product as recited in claim 5, wherein said credential is associated with a group of resources.

7. The computer program product as recited in claim 6, wherein said credential enables access to a group of target applications.

8. The computer program product as recited in claim 5, wherein said LDAP directory comprises a plurality of entries, wherein one of said plurality of entries comprises an identification and a password associated with a unique user, wherein one of said plurality of entries comprises a credential associated with one or more target applications said unique user is authorized to access.

9. A system, comprising:

a processor; and a memory unit coupled to said processor, wherein said memory unit is operable for storing a computer program for logging a user onto a target system and automatically starting a target application while only providing a single user identification and password;

wherein said processor, responsive to said computer program, comprises:

circuitry for receiving a message from a client to log onto said target system to access said target application, wherein said message comprises a first user identification and a first password;

circuitry for accessing a first entry in a Lightweight Directory Access Protocol (LDAP) directory associated with said client to authenticate said user of said client, wherein said first entry comprises a second user identification and a second password;

circuitry for authenticating said user of said client if said first user identification and said first password matches said second user identification and said second password;

circuitry for logging said user onto said target system if said user is authenticated;

circuitry for mapping to a second entry in said LDAP directory associated with said user if said user is authenticated, wherein said second entry comprises a credential associated with said target application, wherein said credential enables said target application to be automatically started; and circuitry for automatically starting said target application by providing said credential to said target application if said user is authenticated.

10. The system as recited in claim 9, wherein said credential is associated with a group of resources.

11. The system as recited in claim 10, wherein said credential enables access to a group of target applications.

12. The system as recited in claim 9, wherein said LDAP directory comprises a plurality of entries, wherein one of said plurality of entries comprises an identification and a password associated with a unique user, wherein one of said plurality of entries comprises a credential associated with one or more target applications said unique user is authorized to access.

* * * * *